United States Patent [19]

Mayumi et al.

[11] Patent Number: 4,806,811
[45] Date of Patent: Feb. 21, 1989

[54] MINIATURE MOTOR

[75] Inventors: Etsuo Mayumi; Michio Hoshino; Mitsu Kase, all of Chiba, Japan

[73] Assignee: Mabuchi Motor Co. Ltd., Japan

[21] Appl. No.: 1,372

[22] Filed: Jan. 8, 1987

[30] Foreign Application Priority Data

Sep. 1, 1986 [JP] Japan .................................. 61-2770

[51] Int. Cl.[4] .............................................. H02K 5/00
[52] U.S. Cl. ................................ 310/89; 310/10 MM; 310/42; 310/90; 310/91; 29/596
[58] Field of Search ............. 310/40 MM, 42, 88, 89, 310/258, 91, 90, 248, 261, 71, 85, 233, 239, 154; 248/674; 29/596

[56] References Cited

U.S. PATENT DOCUMENTS

| | | | |
|---|---|---|---|
| 1,575,660 | 3/1926 | Teipel | 310/89 |
| 2,085,356 | 6/1937 | Greenwald | 310/88 |
| 2,473,105 | 6/1949 | Luenberger | 310/91 |
| 3,154,704 | 10/1964 | Shaffer | 310/91 |
| 3,746,289 | 7/1973 | Johnsen | 248/674 |
| 3,941,339 | 3/1976 | McCarty | 310/91 |
| 4,015,154 | 3/1977 | Tanaka | 310/89 |
| 4,341,967 | 7/1982 | Iwaki | 310/88 |
| 4,566,865 | 1/1986 | Nishitsuji | 248/674 |

Primary Examiner—R. Skudy
Attorney, Agent, or Firm—McGlew and Tuttle

[57] ABSTRACT

A miniature motor having a cup-shaped cylindrical motor case fitted with a plurality of motor mounting holes and a bearing on the closed end face thereof, and a rotor rotatably supported at one end of the shaft thereof in the motor case by the bearing provided on the closed end face of the motor case, a motor mounting portion is provided around motor mounting holes in a raised fashion from the closed end of the motor case so that the surface of the motor mounting portion intersects with the shaft at substantially 90 degrees. Also, a miniature motor in which the surface of the motor mounting portion is ground and polished is disclosed.

4 Claims, 1 Drawing Sheet

FIG. 1
(PRIOR ART)
FIG. 3
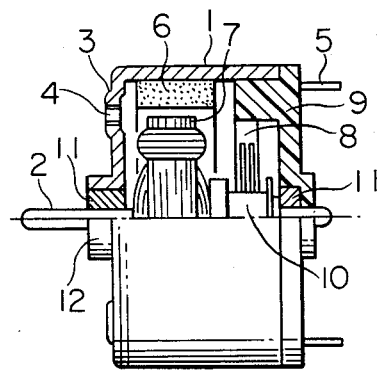
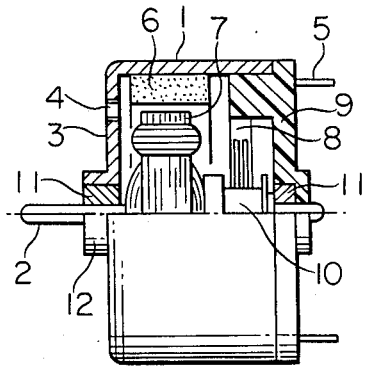
FIG. 2A
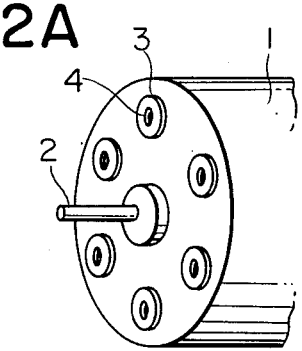
FIG. 2B
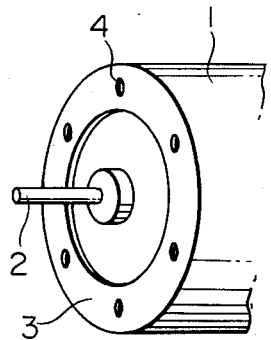
FIG. 2C
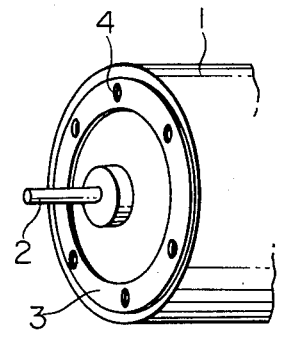

MINIATURE MOTOR

BACKGROUND OF THE INVENTION

This invention relates generally to a miniature motor, and more particularly to a miniature motor which satisfies strict tolerances on squareness between the shaft and the motor mounting surface, as required for compact-disc drive motors, by forming a raised portion around motor mounting holes on the closed end face of the motor case, and grinding, polishing the raised portion.

DESCRIPTION OF THE PRIOR ART

An increasing number of miniature motors of a permanent magnet field type are being used as drive motors for audio, optical and office equipment, and more recently for computer-related equipment as well. In addition, the possibility of applying such miniature motors to compact disc units is now being studied.

Drive motors for compact disc units, however, require extremely close tolerances in mounting the motor on the unit, while, in the miniature motor of the permanent magnet field type having a cup-shaped cylindrical motor case 1 with a plurality of motor mounting holes 4 and a bearing 12, and a rotor 7 rotatably supported at one end of the shaft thereof by the bearing 12 provided on the bottom of the motor case 1, the motor case 1 is usually formed by drawing a metal sheet from considerations of productivity in mass production and cost reduction. It is therefore difficult to find appropriate means for satisfying the abovementioned strict mounting accuracy. As a result, mass-produced motors are subjected to total inspection, at the sacrifice of efficiency, to screen out those meeting the aforementioned requirement. To improve this point, the present Applicant proposed a miniature motor fitted with a spacer machined at high accuracy to maintain required tolerances. This proposal made by the present Applicant has a problem of increased production cost because the spacer itself has to be machined at high accuracy.

SUMMARY OF THE INVENTION

This invention is intended to overcome the aforementioned problems.

It is an object of this invention to provide a miniature motor in which a motor mounting portion is provided around motor mounting holes in a raised fashion on the closed end face of a motor case formed by drawing (on the bottom surface of a cup-shaped motor case), and squareness is maintained between the surfaces of the motor mounting portion and the motor shaft.

It is another object of this invention to provide a miniature motor in which the surface of the motor mounting portion is ground and polished.

It is a further object of this invention to provide a miniature motor in which a plurality of raised motor mounting portions are provided in an isolated island fashion for a plurality of motor mounting holes.

It is still a further object of this invention to provide a miniature motor in which a continuous ring-shaped motor mounting portion is provided for motor mounting holes disposed around the outermost circumference of the motor case end face.

It is still a further object of this invention to provide a miniature motor in which a continuous ring-shaped motor mounting portion is provided for motor mounting holes disposed at slightly inward locations, that is, in a direction toward the motor shaft 2, around the circumference of the motor case end face.

It is still a further object of this invention to provide a miniature motor in which the surface of the motor mounting portion is ground and polished while the body of a completed motor is rotated, with the motor shaft fixed to a jig.

These and other objects and advantages will become more apparent upon a reading of the following description taken in connection with FIGS. 1 and 2 (A), (B) and (C).

BRIEF DESCRIPTION OF THE DRAWINGS

The various features of novelty which characterize the invention are pointed with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

FIG. 1 is a partially sectional side elevation of a miniature motor embodying this invention.

FIGS. 2 (A), (B) and (C) are perspective views of the essential parts of other embodiments of this invention.

FIG. 3 is a partially sectional side elevation of a motor of a conventional type;

FIG. 4 is a sectional view showing a miniature motor rotor shaft connected to a jig according to the invention.

DETAILED DESCRIPTION OF THE EMBODIMENT

In FIGS. 1 through 3, reference numeral 1 refers to a motor case; 2 to a shaft; 3 to a motor mounting portion; 4 to a motor mounting hole; 5 to a motor terminal; 6 to a permanent magnet field; 7 to a rotor; 8 to a brush; 9 to a case cover; 10 to a commutator; 11 to a bearing; and 12 to a bearing portion, respectively.

Since the miniature motor embodying this invention, as shown in FIG. 1, has essentially the same internal construction as the conventional type miniature motor, as shown in FIG. 3, specific description of general features of the motor has been omitted here. Needless to say, the rotor 7 is rotatably supported by the bearings 11 and 11 bearings 11 are respectively mounted in the motor case 1 and case cover 9, respectively. Case cover 9 is insertable into an open end face 15 of the motor case 1.

The miniature motor of this invention has a raised motor mounting portion 3, as shown in FIG. 1 to install the motor on a piece of external equipment. The raised motor mounting portion 3 is formed integrally with the motor case 1 in the mass-production process of the motor case 1. The mass-produced motor case 1 is subjected to grinding and polishing operations at the required surface areas of the raised motor mounting portion 3 thereof. In the conventional type motor as shown in FIG. 3, the motor mounting portion 3 covers the entire end face of the motor case 1. This requires the redressing and modification of irregularities and deformations over a wide area of the motor mounting portion 3 produced during the manufacture of the motor case 1.

FIGS. 2 (A), (B) and (C) show other embodiments of this invention. FIG. 2 (A) shows the case where motor mounting portions 3 are provided in an isolated island fashion corresponding to a plurality of motor mounting holes 4. FIG. 2 (B) shows the construction where a continuous ring-shaped motor mounting portion 3 is provided for motor mounting holes 4 disposed around the outermost circumference of the motor case closed end face. FIG. 2 (C) shows the case where a continuous ring-shaped motor mounting portion is provided for motor mounting holes, which are disposed at slightly inward locations, that is, in a direction toward the motor shaft 2, around the circumference of the motor case closed end face.

In this invention, the motor mounting surface is disposed at 90 degrees with the motor shaft 2, as described above. If higher precision is required for motor installation, the surface of the motor mounting portion 3 can be ground and polished by rotating the motor proper, with the shaft 2 of the assembled motor fixed to a jig 20.

As described above, this invention makes it possible to provide a miniature motor, which can be installed at required precision on a piece of external equipment, at relatively low cost merely by processing and machining the motor case in a mass production process.

While specific embodiments of the invention have been shown and described in detail to illustrate the application of the principals of the invention, it will be understood that the invention may be embodied otherwise without departing from such principals.

What is claimed is:

1. A miniature motor comprising: a cylindrical motor case having a closed end face with a plurality of motor mounting holes formed therein and an open end face; at least one permanent magnet supported on an inner surface of the cylindrical motor case; a first bearing provided on an end of said motor case; a case cover covering an open end of said cylindrical motor case; a second bearing provided at said case cover; a rotor shaft supported by said first and second bearings, said rotor shaft protruding through said motor case closed end face; a commutator supported on said rotor shaft; a rotor supported on said rotor shaft; an electrical contact supported by said case cover; a contact brush supported by said case cover, said contact brush connected to said electrical contact and positioned so as to be in electrical contact with said commutator; and, motor mounting means formed integral with said motor case, said motor mounting means having a surface raised from said motor case closed end face, said motor mounting means surface having a machined plane which is at an angle to said shaft of substantially 90° said mounting means includes one of a plurality of motor mounting portions, each portion being isolated in an island fashion, a position of which corresponding to the motor mounting holes; and motor mounting means includes a continuous ring-shaped portion positioned so as to overlie each of said motor mounting holes.

2. A miniature motor according to claims 1, wherein: said motor mounting means surface machined plane is formed by grinding and polishing the surface.

3. A miniature motor comprising: a cup-shaped cylindrical motor case having a closed end face with a plurality of motor mounting holes formed therein; at least one permanent magnet supported on the inner surface of the cup-shaped cylindrical motor case; a first bearing positioned adjacent the closed end face of said cup-shaped cylindrical motor case; a second bearing positioned opposite from the closed end face of said cup-shaped cylindrical motor case; a rotor shaft supported by said first and second bearing, said rotor shaft protruding from the closed end face of said cup-shaped cylindrical motor case; a rotor rotationally supported by said rotor shaft; a commutator rotationally supported by said shaft; an electrical contact insulatedly supported by said cup-shaped cylindrical motor case; a contact brush connected to said electrical contact and adapted to electrically contact said commutator; and, motor mounting means positioned adjacent said motor mounting holes, said motor mounting means having a surface which is ground and polished based on the position of the rotor shaft after said rotor shaft is supportedly positioned in said bearings so said motor mounting means surface lies in a plane substantially perpendicular to a central axis of said rotor shaft, for mounting said motor to a mounting surface so a central axis of said rotor shaft is perpendicular to the mounting surface and said motor mounting means includes a motor mounting ring-shaped portion positioned on said motor case end face and overlying said motor mounting holes.

4. A miniature motor according to claim 3, wherein: said motor mounting means includes a plurality of motor mounting portions, each motor mounting portion corresponding to the location of said motor mounting holes, and being positioned isolated from other said motor mounting portions.

* * * * *